United States Patent [19]

Noguchi et al.

[11] 4,400,845

[45] Aug. 30, 1983

[54] WINDSHIELD WIPER

[75] Inventors: Hiroki Noguchi, Oobu; Akira Fukami, Okazaki, both of Japan

[73] Assignee: Nippon Soken, Inc., Nishio, Japan

[21] Appl. No.: 265,691

[22] Filed: May 20, 1981

[30] Foreign Application Priority Data

Jun. 3, 1980 [JP] Japan .................................. 55-75355

[51] Int. Cl.$^3$ .............................................. B60S 1/38
[52] U.S. Cl. .................................................. 15/250.42
[58] Field of Search ...................... 15/250.35–250.42, 15/250.2

[56] References Cited

U.S. PATENT DOCUMENTS 3,037,233 6/1962 Peras et al. ...................... 15/250.42
3,618,155 11/1971 Mower .............................. 15/250.42

FOREIGN PATENT DOCUMENTS 2322287 11/1973 Fed. Rep. of Germany .

*Primary Examiner*—Peter Feldman
*Attorney, Agent, or Firm*—Cushman, Darby & Cushman

[57] ABSTRACT

A windshield wiper for an automotive vehicle has a flat plate located in an inclined position in which an edge of the flat plate that is upstream with respect to the air flow above the surface of the windshield is disposed closer to the surface of the windshield than the downstream edge. The flat plate also has a plurality of deflectors for disturbing the air flow. One of the deflectors is located at the upstream edge of the flat plate on the side facing the windshield and the other deflector is located at the downstream edge of the flat plate on the side opposite the windshield.

3 Claims, 5 Drawing Figures

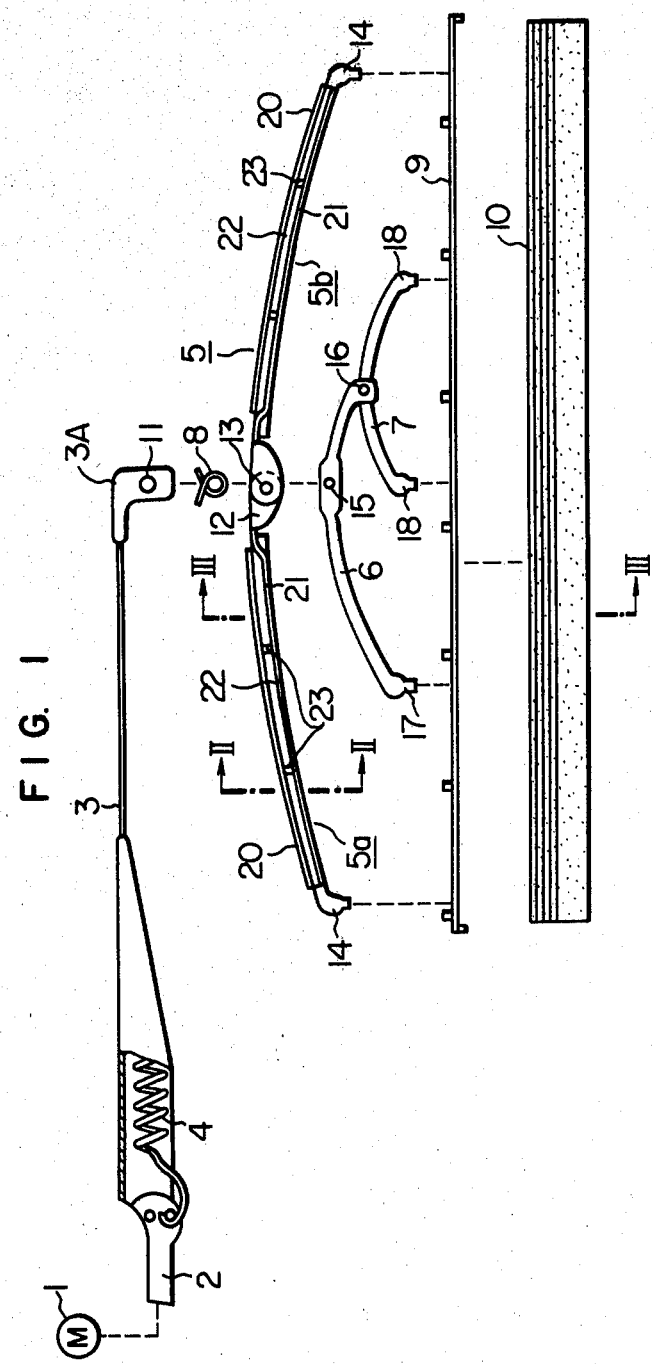
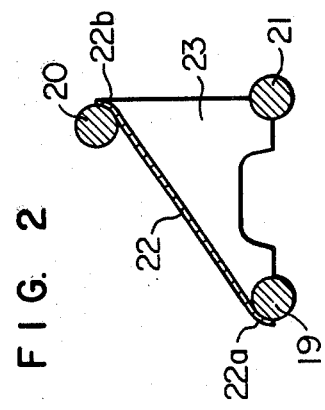

WINDSHIELD WIPER

BACKGROUND OF THE INVENTION

This invention relates to a windshield wiper for wiping the glass of a windshield of an automotive vehicle.

A windshield wiper for wiping the glass of a windshield of an automotive vehicle is disposed in front of the driver and subjected to the pressure of wind during reciprocatory movement on its blade when the vehicle travels at high speed. The blade tends to be blown by the wind pressure and brought out of contact with the surface of the windshield, particularly during its return stroke. Thus windshield wipers of the prior art have suffered the disadvantage that the surface of the windshield is not cleaned satisfactorily and the field of view of the driver is blurred, so that the visibility of the driver is obstructed.

To obviate this disadvantage, various proposals have hitherto been made to void the wiper blade being brought out of contact with the windshield. In one proposal, the force of a spring of the windshield wiper device is increased to press the wiper blade against the surface of the windshield with a force greater than conventional devices. In this case, frictional resistance between the wiper blade and the surface of the windshield increases and makes it necessary to use a powerful motor (large size and high power consumption) for driving the wiper. In addition, there is the disadvantage that when the automotive vehicle at low speed or remains stationary, the wiper blade does not operate effectively to wipe the surface of the windshield.

In another proposal, a vane-shaped member of a large size is attached to the support metal member or support arm. The wind pressure causes the vane-shaped member to produce a force (counter-lift) for pressing the wiper blade against the surface of the windshield. Therefore, the counter-lift force and the force tending to cause the wiper blade to be brought out of contact with the windshield will cancel each other.

When the vane-shaped member is used as proposed, a force tending to press the wiper blade against the surface of the windshield would be generated in principle with an increase in the velocity of the wind blowing against the vane-shaped member. By the way, the direction and the velocity of the wind striking the windshield are not uniform. When the elevation angle of the vane-shaped member suits the wind, the vane-shaped member could achieve the desired effect. However, when the wind is blowing in a direction which is not favorable for the elevation angle, the wiper blade would be brought out of contact with the windshield or would be chattered. With the result, the windshield would not be cleaned satisfactorily. An additional disadvantage is that the field of view of the driver would be narrowed and safe driving of the automotive vehicle would be interfered.

SUMMARY OF THE INVENTION

This invention has been developed for the purpose of obviating the aforesaid disadvantages of the prior art. Accordingly, the invention has as its object the provision of a windshield wiper of simple construction capable of avoiding the wiper blade being brought out of contact with the surface of the windshield.

The aforesaid object can be accomplished according to the invention by providing, in a windshield wiper comprising a wiper blade including an elongated resilient member for wiping the surface of a windshield of an automotive vehicle, at least one lever for supporting the resilient member, a wiper arm connected at its rear end portion to the vehicle and at its front end portion to the lever for performing a reciprocatory movement, the arrangement whereby the blade includes a flat plate disposed in an inclined position with respect to the surface of the windshield in such a manner that an edge of the flat plate disposed upstream, with respect to an air flow produced above the surface of the windshield during high speed operation of the automotive vehicle, is located closer to the surface of the windshield than the downstream edge, and a plurality of deflectors disposed on the upstream edge and the downstream edge respectively of the flat plate for disturbing the air flow, one of the deflectors being located at the upstream edge of the flat plate on the side opposed to the windshield and the other deflector being located at the downstream edge of the flat plate on the opposite side.

BRIEF DESCRIPTION OF THE DRAWINGS

FIG. 1 is an exploded front view of the windshield wiper comprising one embodiment of the invention;

FIG. 2 is a sectional view taken along the line II—II in FIG. 1;

DESCRIPTION OF THE PREFERRED EMBODIMENTS

Figure 3:
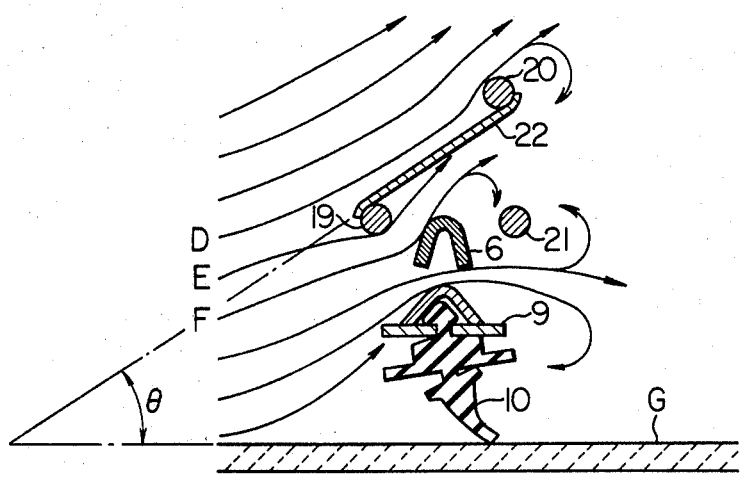
FIG. 3 is a schematic sectional view taken along the line III—III in FIG. 1.

Preferred embodiments of the invention will be described by referring to FIGS. 1–5. A wiper motor 1, a head 2 and a linkage, not shown, interconnecting the wiper motor 1 and head 2 constitute drive means. As is well known, rotation of the wiper motor 1 is changed by the linkage into a pivotal movement of the head 2 directed rightwardly and leftwardly. The drive means is connected to the head 2 and an arm 3 which is connected to the head 2 at its rear end to move in pivotal movement as the head 2 moves in pivotal movement as aforesaid. Mounted between the head 2 and the arm 3 is a spring 4 which applies a load to the arm 3 pivoted at the connection with the head 2. The arm 3 has a pin receiving opening 11 at its front end 3A. An arcuate lever 5 includes a shaft connecting portion 12 which has a pin opening 13, a first lever section 5a, 5b and claws 14. A second lever section 6 has a pin receiving opening 15, a lever of a yoke 7 has claws 17 and 18 respectively, and are connected together by a pin 16. The lever 5 and second lever section 6 are connected to the arm 3 by a pin, not shown, inserted in the pin receiving openings 11, 13 and 15. The lever 5 exerts a pressing force through the claws 14 of the lever 5 in a direction toward a surface G of the windshield by a force of a spring 8. Held by the claws 14 is a backing 9 which is a resilient member supporting the blade rubber member 10. The backing 9 is also held by the claws 17 and 18 of the second lever section 6 and yoke 7 respectively. Thus as the arm 3 moves in pivotal movement, the lever 5, second lever section 6, yoke 7, backing 9 and blade rubber member 10 also move in pivotal movement. So, the blade rubber member 10 moves in reciprocatory movement on the surface G of the windshield to wipe same while being foced thereagainst by the biasing force of the spring 4. The first lever sections 5a, 5b of the lever 5 are constituted by two linear reinforcing members 19 and 20, a wire member 21 and a flat plate 22. The linear reinforcing member 19 and the wire member 21 are secured at one end thereof to the shaft connecting portion 12 and at the other end thereof to the claws 14 of the lever 5. The linear reinforcing member 19 is secured to an edge 22a of the flat plate 22 which is upstream with respect to the flow of air above the windshield, in a manner to project toward the surface G of the windshield. The flat plate 22 is secured to connecting members 23 which in turn are connected to the linear reinforcing member 19 and wire member 21 in a plurality of positions. And the flat plate 22 is disposed in a predetermined angle with respect to the surface G of the windshield. The linear reinforcing member 20 which is arcuate in shape is secured to a downstream edge 22b of the flat plate 22 through substantially the entire length of the first lever section 5a and 5b.

Operation of the windshield wiper of the aforesaid construction will now be described. Before one understands the operation of the device, it will be necessary to take cognizance of the following fact. An air flow at high speed flows in laminar form when there is no obstacle to its flow. But when there is an obstacle and the air impinges on the obstacle, the air flow stagnates on the upstream side (anterior side) of the obstacle and positive pressure is produced by the stagnating air flow. While on the downstream side (posterior side) of the obstacle the air flow separates itself and turbulent flow is produced, thereby causing a negative or subatmospheric pressure.

Upon an air flow at high speed striking the lever 5 shown in FIG. 3, an air flow D flowing along the flat plate 22 on a side thereof opposite the surface G of the windshield flows therealong an angle at which the flat plate 22 is inclined and impinges on the linear reinforcing member 20. Stagnation of the air flow occurred by the impingement on the linear reinforcing member 20 causes the static pressure to rise on the side of the flat plate 22 opposite the surface G of the windshield. An air flow E flowing along the side of the flat plate 22 facing the surface G of the windshield has the static pressure reduced due to a separation from the surface of the flat plate 22 caused by the linear reinforcing member 19 at its downstream edge. An air flow F striking the second lever section 6 generates no force tending to move the second lever section 6 upwardly because of the absence of an obstacle on the downstream edge.

In view of the behavior of the air flow along opposite sides of the flat plate 22, a force tending to press the wiper blade rubber member 10 against the surface G of the windshield is generated on the lever 5 in place of a lift tending to bring the blade rubber member 10 out of contact with the surface G of the windshield.

Another feature of the invention is that as compared with a device of the prior art having a large vane-shaped member attached to the wiper blade, the device according to the invention is small and has improved performance because it is not affected by a side wind.

Figure 4:
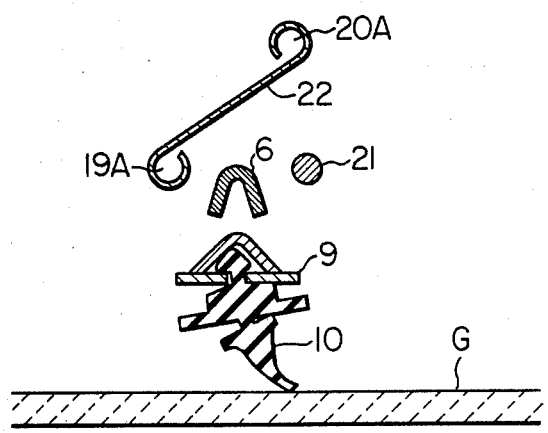
FIG. 4 is a schematic sectional view similar to FIG. 3 but showing another embodiment of the windshield wiper in conformity with the invention.

FIG. 4 shows another embodiment which is distinct from the embodiment shown in FIGS. 1–3. The flat plate 22 shown in FIG. 4 is bent at its upstream edge and downstream edge in such a manner that the upstream edge projects in a direction toward the surface G of the windshield and the downstream end projects in a direction away from the surface G. Consequently, the linear reinforcing members 19 and 20 are dispensed with, because bent portions 19A and 20A will serve as deflectors. Other parts of the construction are similar to those of the embodiment shown in FIGS. 1–3.

Figure 5:
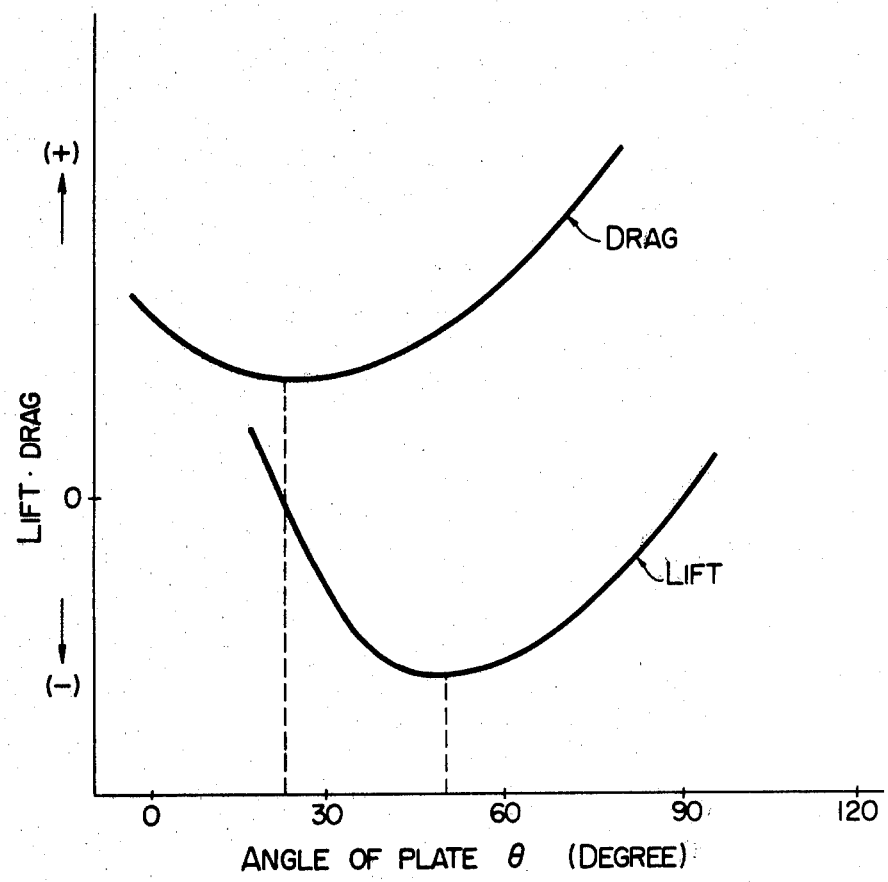
FIG. 5 is a diagram showing the characteristics obtained when the angle of the flat plate of the lever is varied.

The optimum angular position of the flat plate 22 of the lever 5 according to the invention will be described. The lever 5 was tested with regard to the lift and the drag applied thereto by an air flow when the angle formed by the flat plate 22 and the surface G of the windshield is $\theta$. FIG. 5 shows the results of the tests. It will be seen that the lift is minimized and negative when the angle $\theta$ is about 50°. Thus, the force with which the blade is forced against the surface G is high and the drag is minimized when the angle $\theta$ is about 25°. Generally, a windshield wiper preferably has a high blade pressing force and a low drag. Thus, the preferable angle formed by the flat plate 22 and the surface G is in the range between 25° and 50°.

The optimum angle in this invention will be in the range between 35° and 45°, because the negative lift is regarded as important. In brief, the lift is a force tending to move the blade of the wiper away from the surface of the windshield and the drag is a force tending to sweep the blade.

In the windshield wiper according to the invention, the lever 5 has been described as consisting of the first lever section 5a, 5b, the second lever section 6 and the yoke 7 assembled as a unit. However, the second lever section 6 and yoke 7 may be omitted, when the wiper blade is small in size or is used to wipe clean the surface of a flat sheet of glass. Also, the connecting members 23 and wire member 21 may be omitted, when the wiper blade is small in size. The deflectors located at opposite edges of the flat plate on the upstream side and the downstream side are linear reinforcing members 19 and 20. However, it is to be understood that the deflectors need not be continuous in a line. The deflectors preferably have a circular cross-sectional shape from the point of view of developing positive and negative pressures and maintaining strength.

What is claimed is:
1. A windshield wiper comprising:
 a wiper blade including an elongated resilient member for wiping a windshield surface of a vehicle and a lever for holding said resilient member against such surface;
 a wiper arm having one end thereof connected to said lever and the other end connected to a body of the vehicle for effecting oscillation of said blade;
 a flat plate forming a portion of said lever and having opposite edge portions disposed upstream and downstream with respect to the air flow produced above the windshield surface upon the high speed running of the vehicle, said flat plate being inclined with respect to said windshield surface such that said upstream edge portion is located closer to said windshield surface than said downstream edge portion;
 said flat plate being disposed such that the angle defined between the windshield surface and said flat plate is of the order of 35–45 degrees;
 at least one upstream obstruction for disturbing the air flow, said upstream obstruction being disposed on said upstream edge portion of said flat plate so as to project from said flat plate toward the windshield surface; and at least one downstream obstruction for disturbing said air flow, said downstream obstruction being disposed on said downstream edge portion of said flat plate so as to project from said flat plate away from the windshield surface.

2. A windshield wiper as claimed in claim 1, wherein said deflectors at the upstream and the downstream edges of the flat plate comprise linear reinforcing members.

3. A windshield wiper as claimed in claim 1, wherein said obstructions at the upstream and the downstream edges of the flat plate comprise bent portions formed by bending edge portions of the flat plate.

* * * * *